(12) United States Patent
Lorey

(10) Patent No.: US 7,950,511 B2
(45) Date of Patent: May 31, 2011

(54) VEHICLE SEAT WITH A DEVICE FOR A SEAT HEIGHT ADJUSTMENT MECHANISM THEREOF, AND DEVICE FOR SEAT HEIGHT ADJUSTMENT MECHANISM OF A VEHICLE SEAT

(75) Inventor: Konstantin Lorey, Schmidgaden (DE)

(73) Assignee: Grammer AG, Amberg (DE)

( * ) Notice: Subject to any disclaimer, the term of this patent is extended or adjusted under 35 U.S.C. 154(b) by 456 days.

(21) Appl. No.: 11/803,311

(22) Filed: May 14, 2007

(65) Prior Publication Data

US 2007/0267906 A1 Nov. 22, 2007

(30) Foreign Application Priority Data

May 16, 2006 (DE) .................. 10 2006 022 767

(51) Int. Cl.
*B60N 2/16* (2006.01)
*F16D 67/02* (2006.01)
(52) U.S. Cl. .............. 192/223.1; 192/15; 297/344.12
(58) Field of Classification Search ............. 297/344.12; 192/15, 19

See application file for complete search history.

(56) References Cited

U.S. PATENT DOCUMENTS

| | | | | |
|---|---|---|---|---|
| 2,744,432 | A * | 5/1956 | Rueb ........................... | 192/43.1 |
| 5,881,854 | A * | 3/1999 | Rougnon-Glasson .......... | 192/15 |
| 6,230,867 | B1 | 5/2001 | Schwarzbich ............. | 192/223.2 |
| 6,575,278 | B1 * | 6/2003 | Schumann et al. ............. | 192/19 |

FOREIGN PATENT DOCUMENTS

| | | |
|---|---|---|
| CN | 200710104014.8 | 5/2007 |
| DE | 4008438 | 5/1991 |
| DE | 197 44 944 | 10/1997 |
| DE | 298 02 055 | 6/1999 |
| DE | 100 52 234 | 10/2000 |
| DE | 202 20 200 | 2/2004 |
| DE | 20220201 | 2/2004 |
| DE | 10338305 | 3/2005 |
| EP | 0908349 | 4/1999 |
| EP | 07 107 727.5 | 5/2007 |
| GB | 1060922 | 3/1867 |
| WO | WO 99/41101 | 8/1999 |

* cited by examiner

*Primary Examiner* — Rodney H Bonck
(74) *Attorney, Agent, or Firm* — Ballard Spahr LLP

(57) ABSTRACT

The invention relates to a device for a seat height adjustment mechanism of a vehicle seat, comprising a drive element which can be driven in opposite directions of rotation, and a driven element which can be driven by means of this drive element, and also comprising two unilaterally acting freewheels which are arranged between this drive element and this driven element and are connected to run in opposite directions, and of which in each case one can be brought out of engagement by means of an unlocking device, and further comprising a restoring device, by means of which the drive element can automatically be brought back into the neutral position when it is deflected out of its neutral position, wherein, in order to allow a fine adjustability of the driven element driven by the drive element, the pivotability of the drive element is limited by means of two stops.

11 Claims, 3 Drawing Sheets

VEHICLE SEAT WITH A DEVICE FOR A SEAT HEIGHT ADJUSTMENT MECHANISM THEREOF, AND DEVICE FOR SEAT HEIGHT ADJUSTMENT MECHANISM OF A VEHICLE SEAT

CROSS REFERENCE TO RELATED APPLICATIONS

This application claims priority to German Patent Application No. 10 2006 022 767.0, filed May 16, 2006, which application is hereby incorporated by this reference in its entirety.

FIELD OF THE INVENTION

The invention relates to a vehicle seat with a device for a seat height adjustment mechanism of this vehicle seat, and also to a device for an adjustment mechanism for a vehicle seat.

BACKGROUND OF THE INVENTION

A device for an adjustment mechanism of a vehicle seat is already known from DE 32 03 151 A1, which comprises a drive element which can be driven in opposite directions of rotation and a driven element which can be driven by means of this drive element and can be pivoted in opposite directions of rotation. In the device proposed therein, two unilaterally acting freewheels are provided between the drive element and the driven element, said freewheels being connected to run in opposite directions so that the locked direction of the first of these freewheels corresponds to the free running direction of the second of these freewheels and the locked direction of the second of these freewheels corresponds to the free running direction of the first of these freewheels. The freewheels are assigned a common (inner) toothing (notched formation) arranged along a circular path.

Each of the unilaterally acting freewheels has a (separate) catch or pawl, which is pivotably held on a respective bearing bolt fixed to the drive element and is pressed in a spring-loaded manner against the toothing. The spring provided for this purpose is configured as a helical spring acting as a tension spring, which engages with its distal ends at one side in the pawl of the first freewheel and at the other side in the pawl of the second freewheel.

For the relative rotation of the driven element with respect to the drive element, in the configuration known from DE 32 03 151 A1 an unlocking device is provided for optionally bringing in each case one of the freewheels out of engagement. This unlocking device is formed by means of an essentially hollow semicylindrical collar which extends on a rotatably mounted handwheel which serves as the driving actuating device for the drive element. In the event of an external torque acting on the handwheel about the axis of rotation thereof, then depending on the orientation of the torque said collar in each case loads one of the pawls in such a way that it, or the freewheel of which it forms part, comes out of engagement and, if the torque on the handwheel continues without any change in orientation, strikes a pin fixed to the drive element which is different from the aforementioned pin, so that the handwheel subjected to a torque from outside drives the drive element in rotation via the engagement of its collar in the respective pawl and the coupling thereof to the stop pin fixed to the drive element. The drive element in turn entrains the driven element in rotation via the other unilaterally acting freewheel which is still in engagement, on which driven element the toothing of the two freewheels is formed.

In order to pivot the driven element in the opposite orientation, the handwheel can likewise be subjected to a torque in the opposite orientation. Starting from the position run through in this case, in which the two freewheels are still in engagement, the relationships mentioned above are reversed, so that the freewheel which was brought out of engagement above instead remains in engagement and is used to transmit torque to the driven element, and accordingly the other freewheel is brought out of engagement by means of the collar.

It should be noted that a stop pin of the aforementioned type is also provided for the freewheel which is then not in engagement, so as to allow the transmission of torque from the handwheel to the drive element in this other direction of rotation.

This device known from DE 32 03 151 A1 appears in principle to be highly suitable for adjustment mechanisms of vehicle seats. However, one disadvantage with this configuration is that the fineness with which the vehicle seat can be adjusted largely depends on the motor capabilities of the user.

SUMMARY OF THE INVENTION

The object of the present invention is therefore to provide a device for an adjustment mechanism of a vehicle seat, which aids fine adjustment.

According to the invention, there is proposed a device which is intended in particular for an adjustment mechanism of a vehicle seat. A vehicle seat according to the invention forms the subject matter of claim 11. Preferred further developments form the subject matter of the dependent claims.

According to the invention, therefore, there is proposed a device for a seat height adjustment mechanism of a vehicle seat. This device comprises a drive element which can be driven in opposite directions of rotation, and a driven element which can be driven in opposite directions of rotation by means of this drive element. This device also comprises a first unilaterally acting freewheel and a second unilaterally acting freewheel. The driven element can be driven by the drive element optionally via the first or the second of these two freewheels. The locked direction of the first of these two freewheels corresponds to the free running direction of the second of these two freewheels, and the free running direction of the first of these two freewheels corresponds to the locked direction of the second of these two freewheels.

The device also comprise an unlocking device for optionally bringing in each case one of the freewheels out of engagement.

A neutral position is assigned to the drive element. This neutral position is in particular a predefined rotation position of the drive element in which both the first and the second freewheel is in an engaged position. A restoring device is provided for the drive element and acts in the direction of the neutral position when the drive element is deflected.

As already mentioned, the drive element can be pivoted or driven (by rotation or pivoting) in two opposite directions of rotation (or orientations). A first stop is provided for limiting the pivotability of the drive element in a first of these two directions of rotation (or orientations) and a second stop is provided for limiting the pivotability of the drive element in the second of these two directions of rotation (or orientations).

In one advantageous embodiment, it is provided that the drive element is a part which is or can be driven manually or by an electric motor—optionally by means of an actuating part—and that the driven element which is or can be driven by the drive element provides an adjusting force on the output side or an adjusting torque on the output side for the seat height adjustment mechanism.

The first and the second stop for the drive element may be arranged for example on a housing or part which in one advantageous further development is fixed to one of the components to be adjusted relative to one another by means of the adjustment mechanism. In the case of a seat height adjustment mechanism, this may be such that this housing or part is fixed to a rigid component of the seat, in particular the seat surface, which is to be height-adjusted relative to the vehicle floor, or such that this housing or part is fixed to the vehicle body or the vehicle floor, relative to which the seat height is to be adjusted.

In one advantageous further development, the first unilaterally acting freewheel has a first catch or pawl and the second unilaterally acting freewheel has a second catch or pawl which is different therefrom. In one advantageous embodiment, the first and the second pawl are spring-loaded, in particular in such a way that they are in each case spring-loaded for engaging in a toothing, such as an inner toothing, so as to be locked in their respective locked position in or in the direction of this toothing. In this case, separate toothings of the respective freewheel may be provided for the two pawls; however, in one particularly advantageous embodiment, a common toothing is provided which is intended to cooperate with both pawls, wherein the teeth of this toothing are arranged for example along a circular path or a portion of such a circular path at a distance from one another, and preferably with a constant pitch.

In one particularly preferred embodiment, this toothing is designed as an inner toothing on a sleeve-like section, which in one particularly preferred further development is part of the driven element.

The pawls are preferably arranged pivotably in each case, namely in particular by means of a respective pin on the drive element. In one particularly advantageous embodiment, these pins extend parallel to and at a distance from the pivot axis of the drive element, in particular being offset from one another by approx. 120° to 180°, particularly preferably by approx. 180° or by 180°, with respect to the circumferential direction of the pivot axis of the drive element. It may be provided that the two pawls are loaded by a common spring which is supported on both of these pawls and preferably acts as a pressure spring.

The unlocking device may for example have a collar, which for example forms part of a hollow cylinder. In one advantageous embodiment, such a collar may be fixed to a housing or part, such as for example the housing or part mentioned elsewhere in this disclosure, or may be formed by this. In this case, it may be provided that, due to a torque applied to the input side of the drive element—depending on the orientation of the torque—the first or the second pawl is pressed by this drive element and via its bearing pins against in each case one of the two ends of this collar as seen in the circumferential direction of this collar, in such a way that the corresponding freewheel comes out of engagement.

The restoring device is in particular designed in such a way that, when the drive element is pivotably deflected out of its neutral position, it loads or biases said drive element in the direction of this neutral position so that the drive element automatically returns to its neutral position when an external load causing this deflection is relieved, such as for example a load or torque introduced manually by a user or by an electric motor into the drive element or an actuating part coupled thereto. This preferably takes place in such a way that, during and/or on account of this "return", a freewheel that had been brought out of engagement by means of the unlocking device is moved back into an engaged position. The neutral position of the drive element is therefore in particular such that the two unilaterally acting freewheels are in engagement in this neutral position.

BRIEF DESCRIPTION OF THE DRAWINGS

An example of embodiment of the invention will be explained in more detail below with reference to the figures, in which.

DESCRIPTION OF THE PREFERRED EMBODIMENTS

Figure 1:
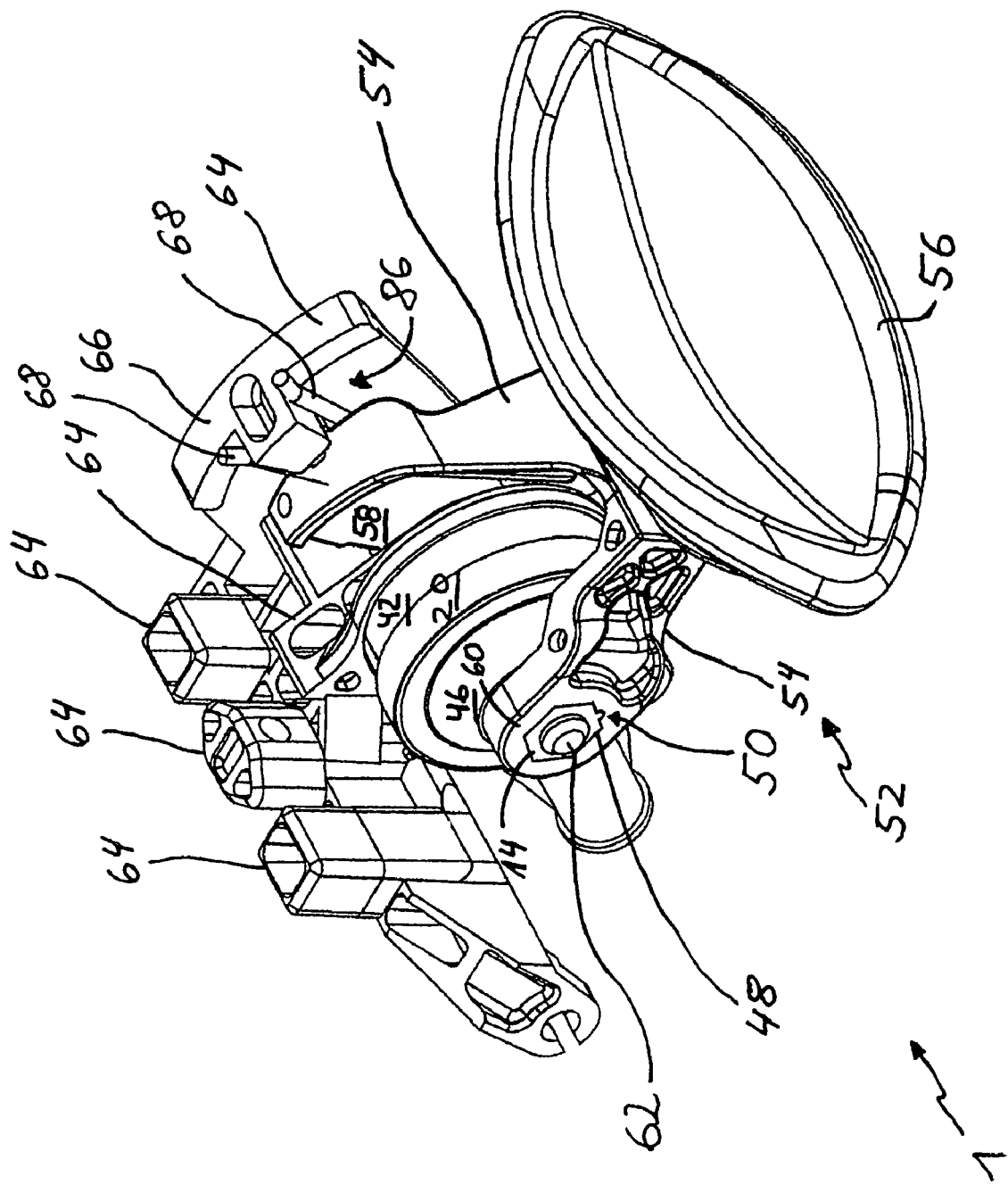
FIG. 1 shows an example of a device according to the invention for a seat height adjustment mechanism of a vehicle seat, in a three-dimensional, schematic view.
Figure 2:
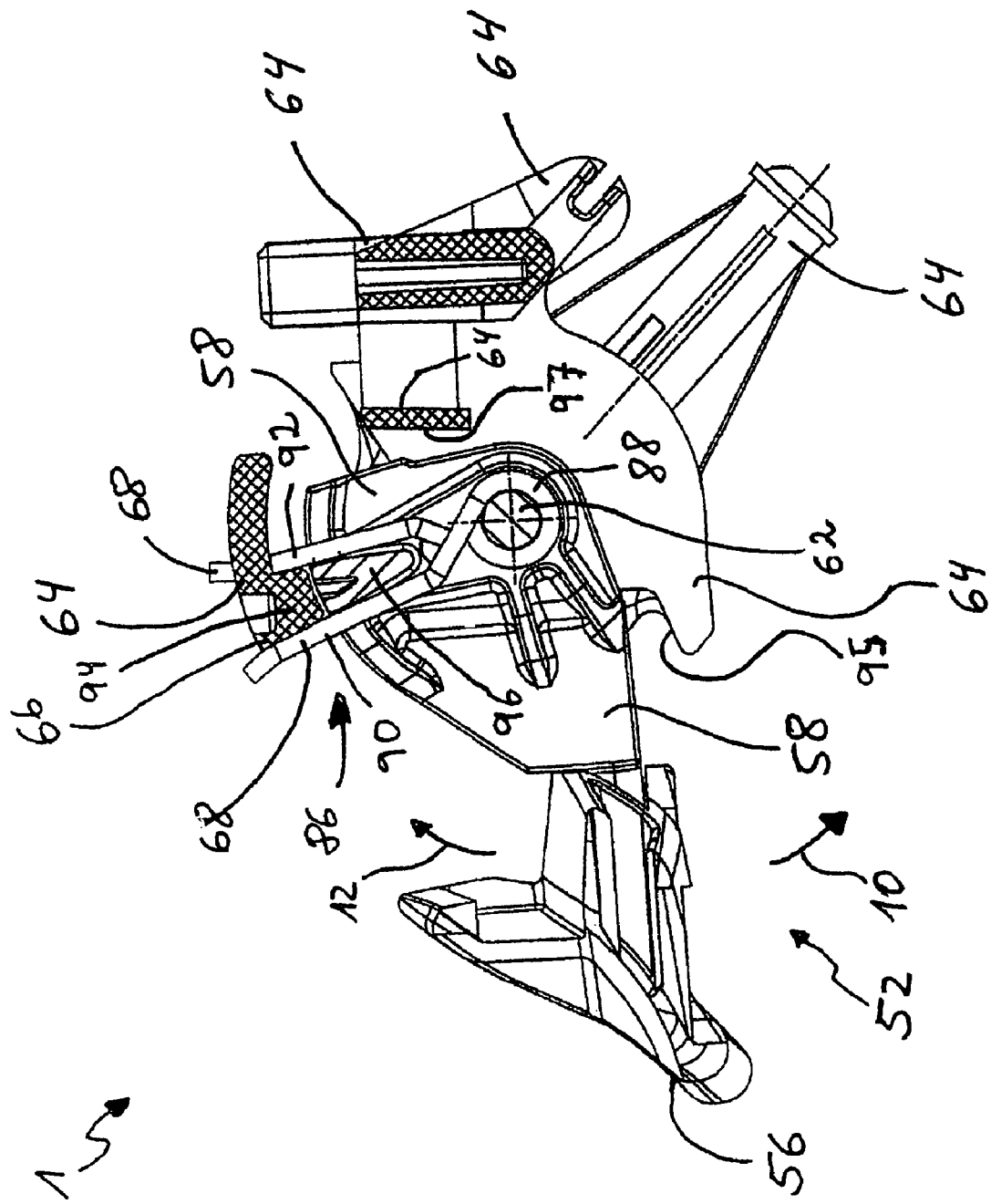
FIG. 2 shows a first sectional view of the device shown in FIG. 1.
Figure 3:
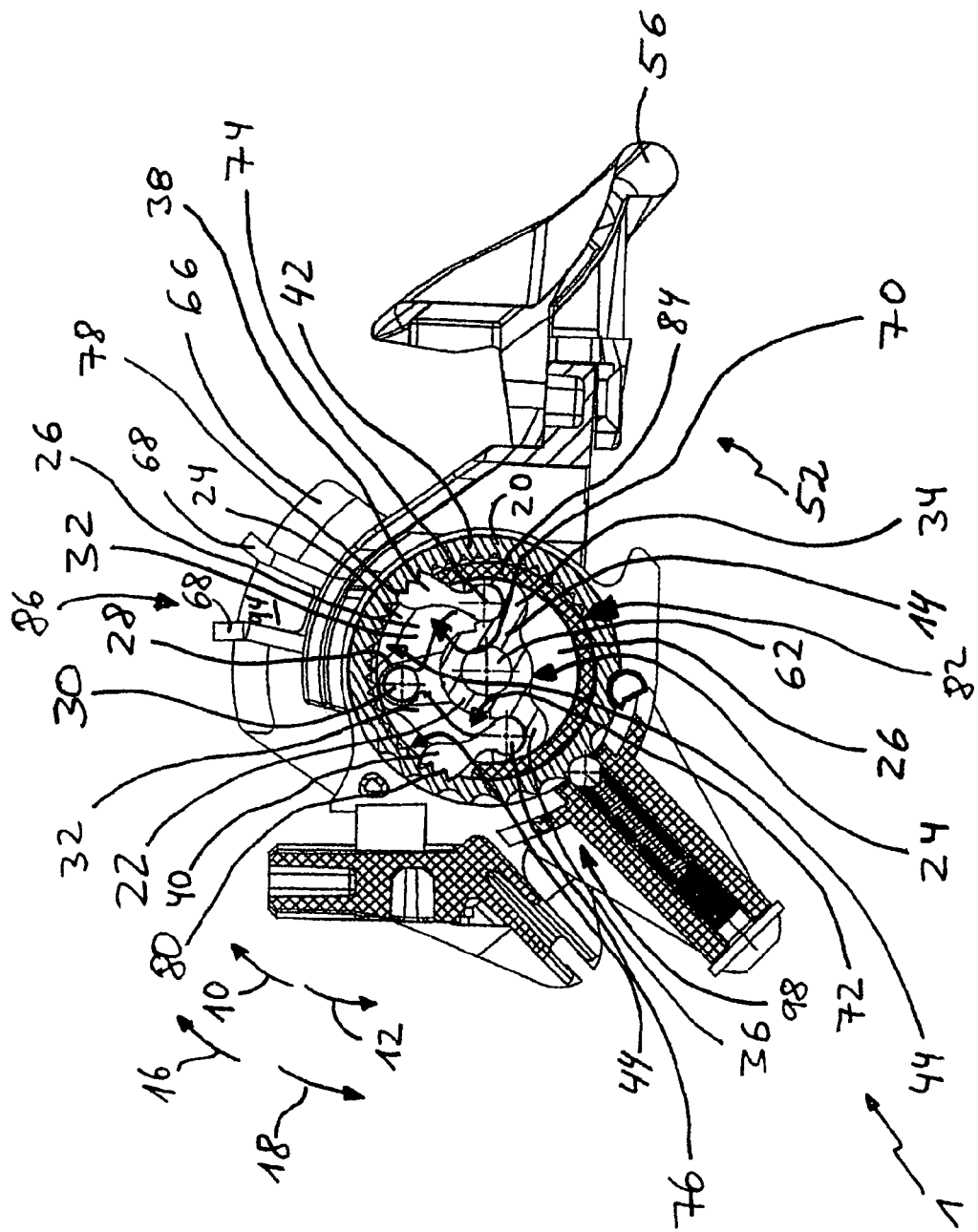
FIG. 3 shows a second sectional view of the device shown in FIG. 1.

FIGS. 1 to 3 show an example of embodiment of a device 1 according to the invention. This device 1 is intended for example for a seat height adjustment mechanism of a vehicle seat, or may be part of such a mechanism.

This device comprises a drive element 14 which can be driven in opposite directions of rotation 10, 12, and also a driven element 20 which can be driven in opposite directions of rotation 16, 18 by means of this drive element 14.

The drive element 14 is designed as a rotatable or pivotable hollow shaft 22, on which a flange 24 is formed. This flange 24 has an essentially circular disc 26 which is held on the hollow shaft 22 in a manner essentially concentric thereto and has at its radially outer end a radially outwardly protruding projection 28.

A bearing pin 30 which extends parallel to the axis of rotation of the drive element 14 is integrally formed on the flange 24, which bearing pin holds a second spring 32, the function of which will be explained in more detail below.

Two openings of circular cross section are formed in the flange 24, the axes of said openings running parallel to the axis of rotation of the drive element 14. These openings are configured as through-openings here. As can clearly be seen in FIG. 3, these two openings are in each case arranged in a radially outer region of the flange 24 and—as seen in the circumferential direction of this flange 24—are offset from one another by essentially 180° or approximately by 170°, wherein said angle may also assume other values. On the axial side of these openings, on which the bearing pin 30 extends from the flange 24, each of these openings is adjoined in the axial direction—essentially without any offset in the radial direction—by an essentially partially hollow cylindrical wall section 34 or 36 which protrudes axially and in collaboration with the respectively associated aforementioned openings serves as a bearing point for a respective pawl 38 or 40, the function of which will be explained in more detail below. As clearly shown in FIG. 3, these wall sections 34, 36 are in each case integrally formed with their radially inner region on the hollow shaft 22 (with respect to the radial direction of the hollow shaft 22).

The driven element 20 has an essentially hollow cylindrical outer wall 42, which on its radially inner side forms an (inner) toothing 44. This toothing 44, the function of which will be discussed in more detail below, extends over an angle of less than 360° or less than 300° and in this case of approx. 270°, as seen in the circumferential direction of the outer wall 42.

While the hollow cylindrical outer wall 42 is essentially open at one axial end, an end wall 46 of the driven element 20 forms a disc-like part integrally formed on the outer wall 42 at the opposite axial end of the outer wall 42. A through-opening of circular cross section is provided in this end wall 46, through which the hollow shaft 22 extends and against which the hollow shaft 22 is supported so as to mount the drive element 14 and the driven element 20 such that they can pivot relative to one another. The drive element 14 is inserted in the driven element 20. This is done in particular in such a way that a free end of the wall section 34 and/or 36 and/or of the bearing pin 30 is or can be supported on the inner side of the end wall 46.

At the end or end section protruding out of the driven element 20 though the through-opening in the end wall, the hollow shaft 22 has a rotation entrainment means 48, which in this case is designed in the manner of a hexagonal outer shape and is provided with a grooving 50.

A corresponding negative contour of this hexagonal outer shape provided with a grooving 50 is formed by a corresponding opening or through-opening in an actuating element or actuating device 52, which is provided for the driving actuation of the drive element 14, wherein the hollow shaft 22 and the actuating element or actuating device 52 are coupled to one another in rotation via the engagement of these contours. The grooving 50 facilitates insertion in a predetermined relative position. This actuating device 52 has a fork-shaped part 54, to which there is attached an actuating handle 56 for manual actuation which may be configured as a foot-operated actuating element or as a hand-operated actuating element.

With its two flanges 58, 60 which define the fork shape, the fork-shaped part 54 axially surrounds the driven element 20 with the drive element 14 inserted therein. While the aforementioned opening in the actuating device 52 which forms a negative contour of the hexagonal outer shape of the hollow shaft 22 with a grooving 50 is intended to couple the drive element 14 in rotation to a second 60 of the two flanges 58, 60, the first 58 of these two flanges 58, 60 has a through-opening which is intended to form a further bearing point for the actuating device 52.

An axle or shaft 62 is pushed through the hollow shaft 22 with the second flange 60 of the actuating device 52 borne by it and with the driven element 20 plugged onto it and also through the through-opening in the first flange 58.

This axle or shaft 62 is mounted in a housing 64. However, it should be noted that this housing 64 is not designed here as an enveloping housing, which in principle may be the case in an alternative embodiment. Rather, the housing 64 is intended for mounting the device 1, in particular in a fixed manner, on a surrounding, fixed component such as the vehicle body or vehicle floor or vehicle seat, in particular a rigid component of the vehicle seat surface, and is referred to as the housing 64 against this background. The housing 64 has two cooperating fork-shaped flanges 66 (one of these can clearly be seen in the figures), in which through-openings are provided for the mounting of the axle or shaft 62, which consequently extends through these two through-openings. The fork contour formed by the two flanges 66 axially surrounds—with respect to the axial direction of the axle or shaft 62—the first flange 58 of the fork-shaped part 54 of the actuating device 52 and also a first spring element 68, the function of which will be explained in more detail below.

The drive element 14 and the driven element 20 can be pivoted about their axis of rotation relative to one another and with respect to the housing 64.

The device 1 furthermore has a first unilaterally acting freewheel 70 and a second unilaterally acting freewheel 72. These two freewheels 70, 72 are arranged between the drive element 14 and the driven element 20 and act between the drive element 14 and the driven element 20. The driven element 20 can be driven by the drive element 14 optionally via the first 70 or the second 72 of these two freewheels 70, 72. These two (in each case) unilaterally acting freewheels 70, 72 are arranged or connected to run in opposite directions in such a way that the locked direction of the first 70 of these two freewheels 70, 72 corresponds to the free running direction of the second 72 of these freewheels 70, 72, and the locked direction of the second 72 of these two freewheels 70, 72 corresponds to the free running direction of the first 70 of these freewheels 70, 72.

The first unilaterally acting freewheel 70 has a first spring-loaded and pivotably mounted catch or pawl 38, and the second unilaterally acting freewheel 72 has a second spring-loaded and pivotably mounted catch or pawl 40.

A pin-type section 74 is formed by the first pawl 38 and a pin-type section 76 is formed by the second pawl 40. With their respective pin-type sections 74 and 76, which in each case extend essentially parallel to the axis of rotation of the drive element 14, these pawls 38, 40 are in each case pivotably mounted on this drive element 14, and namely on the flange 24 or disc 26 thereof. To this end, the pin-type section 74 or 76 is received by the respective unit consisting of one of the aforementioned through-openings with the respective adjoining, essentially partially hollow cylindrical, axially protruding wall section 34 or 36.

The pawls 38 and 40 in each case form teeth 78 and 80 for cooperating with the inner toothing 44 to form the first 70 and second unilaterally acting freewheel 72. As already mentioned, the pawls 38, 40 and the two unilaterally acting freewheels 70, 72 are in each case spring-loaded. For this purpose, the aforementioned second spring 32 held by the bearing pin 30 loads the pawls 38, 40, namely in particular in such a way that the teeth 78, 80 thereof are pressed against or into or in the direction of the inner toothing 44. This second spring 32 is formed here by a spring plate which is placed—in particular in a curved manner—around the aforementioned pin 30 and loads on the one hand the first pawl 38 and on the other hand the second pawl 40 with its two free ends, which for example are angled.

In this case it is provided that, when a torque acting in the direction of the first direction of rotation 10 is applied to the drive side of the drive part 14 with teeth 78, 80 engaging accordingly in the inner toothing 44, the first freewheel 70 is loaded in its free running direction and the second freewheel 72 is loaded in its locked direction.

Furthermore, the device 1 has an unlocking device 82 for optionally bringing in each case one of the freewheels 70 or 72 out of engagement. To form this unlocking device 82, a hollow semicylindrical collar 84 is formed on the housing 64. This hollow semicylindrical collar 84 extends radially within and in the circumferential direction of the hollow cylindrical outer wall 42 of the drive part 20, essentially from the first pawl 38 to the second pawl 40.

When, starting from a neutral position of the drive element 14, this drive element 14 is loaded in its direction of rotation 10 or 12 with a torque about its axis of rotation, as a result—depending on this direction of rotation 10 or 12—one of the pawls 38 or 40 is pressed against an end wall of this collar 84 in such a way that the corresponding freewheel 70 or 72 automatically comes out of engagement and the corresponding pawl 38 or 40 lifts away from the inner toothing 44, namely in particular counter to the spring force of the second spring 32. In this case it is provided in particular that the collar 84 pushes radially between the toothing 44 and the teeth 78 or 80 of the respective pawl 38 or 40. The second spring 32 provides a restoring force here, which means that the respective pawl 38 or 40 or the corresponding freewheel 70 or 72 automatically comes back into engagement by pivoting the drive element 14 back accordingly. The cooperation of the drive element 14 with the pawls 38, 40 and the collar 84 is such that, by pivoting the drive element 14 out of its neutral position, always the pawl 38 or 40 of that unilaterally acting freewheel 70 or 72 which is loaded in its free running direction is brought out of engagement by means of the collar 84.

By the aforementioned optional respective pivoting of the drive element 14 out of its neutral position in one of the two directions of rotation 10, 12, a torque is transmitted from the drive element 14 to the driven element 20 via the freewheel 70 or 72 which is not brought out of engagement by means of the unlocking device 82 or the collar 84 thereof.

The neutral position of the drive element 14 is in this case a rotation position or respective rotation position of the drive element 14 in which both freewheels 70, 72 are in an engaged position and contact the inner toothing 44 with their teeth 78 and 80.

A restoring device 86 is provided for the drive element 14. This restoring device 86 means that, when the drive element 14 is deflected out of its neutral position in either one of the directions of rotation 10 or 12, a restoring force acting in the direction of the neutral position of the drive element 14 acts on the drive element 14. In this example of embodiment, this restoring device 86 comprises a first spring element or first spring 68. This first spring element 68 is configured here as a torsion spring.

The spring element 68 is made from wire for example and has a plurality of windings 86 or is multi-wound. The free ends 90, 92 of the spring element 68 cross over one another and protrude from the region of the windings 88 and may for example extend in a straight line or in an essentially straight line, as can clearly be seen from FIG. 2.

The spring element 68 is borne by the axle or shaft 62 extending through the windings 88 thereof. With respect to the axial direction of this axle or shaft 62, an axially extending protrusion 94 or 96 extends away from the housing 64 on the one hand—namely in particular away from one of the two flanges 66 of this housing 64—and away from the actuating element or actuating device 52 coupled in rotation to the drive part 14 on the other hand, wherein these protrusions 94 and 96 overlap one another axially. With respect to the radial direction of the axle or shaft 62, these protrusions 94 and 96 are arranged radially next to one another.

In order to form this restoring device 86 for the drive element 14, the two free ends 90, 92 of the spring element 68 engage round these protrusions 94 and 96—preferably with a prestress—so that these protrusions 94 and 96—as seen in the circumferential direction of the axle or shaft 62—are caught between these two free ends 90, 92 of the spring element 68. In the state with no external load, a relative position of the protrusions 94 and 96 is set which essentially matches the neutral position of the drive element 14 or is assigned to this neutral position or corresponds to this neutral position.

When the actuating element or actuating device 52 or the actuating handle 56 is loaded from the outside so as to pivot it in one of its two directions of rotation 10, 12 and thus, due to being coupled in rotation with the drive element 14, this drive element is pivoted, the two protrusions 94 and 96 also pivot with respect to one another, as seen in the circumferential direction of the axle or shaft 62, wherein—depending on the direction of rotation—one of the two free ends 90, 92 of the first spring element 68 is held against one of the two protrusions 94 or 96 and the other of the two free ends 90, 92 of the first spring element 68 is held against the other of the two protrusions 94 or 96, so that a restoring force (which increases as the angle of rotation increases) acts on the actuating element or actuating device 52 and thus on the drive element 14 in the direction of the neutral position of the drive element 14. When this external load is relieved, the drive element 14 is automatically moved back into its neutral position.

A first stop 95 is provided in order to limit the pivotability of the drive element 14 in a first 10 of these two directions of rotation 10, 12 (or orientations), and a second stop 97 is provided in order to limit the pivotability of the drive element 14 in the second 12 of these two directions of rotation 10, 12 (or orientations) of this drive element 14.

The stops 95, 97 are in each case formed on the housing 64. When the actuating element or actuating device 52 or actuating handle 56 is pivoted starting from the neutral position, and thus—via the corresponding rotational coupling to the drive element 56 in either of the two directions of rotation 10, 12—one of the freewheels 70, 72 is brought out of engagement as described above by means of the unlocking device 82 and a torque is transmitted from the drive element 14 to the driven element 20 via the other of the freewheels 70, 72, so that the driven element 20 is pivoted. In this case, the two protrusions 94 and 96 also pivot with respect to one another, and consequently an increasing restoring force or restoring torque is built up in the restoring device 86 or the spring element 68.

When—depending on the direction of rotation—a stop position against one of the stops 95, 97 is reached, a continued pivoting in the same direction of rotation 10 or 12 is blocked. A relieving of the external force or torque bringing about the aforementioned pivoting leads to the restoring device 86 bringing the drive element 14 back into its neutral position and thus both freewheels 70, 72 are again in an engaged position. During this pivoting back into the neutral position of the drive element 14, the freewheel 70 or 72 via which a torque was previously transmitted to the driven part 20 is moved in its free running direction.

The number of teeth over which the teeth 78 or 80 of the pawl 38 or 40 are displaced or moved in the circumferential direction of the toothing 44 with respect to the teeth of the toothing 44 can in this case be selected by suitably selecting the position of the stops 95, 97, in particular during manufacture.

In one advantageous embodiment, it may be provided that the teeth are displaced with respect to one another by a number of teeth which is predetermined and which for example is less than four. It is particularly advantageous if the teeth are displaced with respect to one another by just one tooth, which allows particularly fine adjustment. However, in the example of embodiment, the adjustment step is defined by the outer toothing of the driven element 20 or the arresting device 98 or the pitch of the outer-toothing-like section of the arresting device 98, which is provided on the driven element 20. The adjustment step defined hereby may be for example 15°, but may also be predetermined differently beforehand. In the case of a seat height adjustment mechanism for example, a very fine adjustment of the seat height can thus be achieved which is not dependent on the motor capabilities of the user. In a seat height adjustment mechanism, it may for example be provided that the driven part 20 brings about adjustment of the seat height via cords or the like.

In order to pivot the driven element 20 (in the same direction of rotation) through an angle which is greater than the angle that it travels through when the drive element 14 is moved from its neutral position into a stop position against one of the stops 95, 97, the drive element 14 may be moved back and forth several times in succession between its neutral position and its stop position with respect to the same stop 95 or 97 in each case.

The maximum adjustment range of the driven element 20 can also be restricted. In the example of embodiment shown in the figures, this is achieved in such a way that the adjustment range of the driven element 20 is defined by the size of the inner toothing 44 of this driven element 20. The pawls 38, 40 can therefore engage only within the toothed region (the inner toothing 44), so that an empty stroke is brought about outside this toothed region (the inner toothing 44) upon actuation.

In the configuration shown by way of example in the figures, a spring-loaded arresting device 98 is also provided, which is in an arrested position in defined positions of the driven element 20. To this end, it may be provided that depressions are formed on the outer surface of the hollow cylindrical outer wall 42 of the driven element 20, spaced apart over the circumference thereof, and a spring-loaded ball is pressed against this outer surface radially from the outside so that it engages in a respective one of the depressions in defined positions. Instead of a spring-loaded ball, a spring plate may also be provided for example, which forms a cylindrical engagement region for engagement in the depressions.

All the features disclosed in the application documents are claimed as essential to the invention in so far as they are novel individually or in combination with respect to the prior art.

LIST OF REFERENCES 1 device for a seat height adjustment mechanism of a vehicle seat
10 first direction of rotation of 14
12 second direction of rotation of 14
14 drive element
16 first direction of rotation of 20
18 second direction of rotation of 20
20 driven element
22 hollow shaft of 20
24 flange of 20 on 22
26 disc of 24
28 projection on 26
30 bearing pin for 32 on 26
32 second spring
34 protruding partially hollow cylindrical wall section on 24
36 protruding partially hollow cylindrical wall section on 24
38 first pawl of 70
40 second pawl of 72
42 hollow cylindrical outer wall of 20
44 toothing on 42
46 end wall of 20
48 rotation entrainment means on 22
50 grooving on 48
52 actuating element or actuating device
54 fork-shaped part of 52
56 actuating handle of 52
58 first flange of 54
60 second flange of 54
62 axle or shaft
64 housing
66 flange of 64
68 first spring element of 86
70 first unilaterally acting freewheel
72 second unilaterally acting freewheel
74 pin-like section of 38
76 pin-like section of 40
78 teeth of 38
80 teeth of 40
82 unlocking device
84 hollow semicylindrical collar of 82
86 restoring device for 14
88 windings of 68
90 free end of 68
92 free end of 68
94 protrusion
95 first stop
96 protrusion
97 second stop
98 spring-loaded arresting device

The invention claimed is:

1. Device for a seat height adjustment mechanism of a vehicle seat, wherein this device comprises
   a drive element which can be driven in opposite directions of rotation,
   a driven element which can be driven in opposite directions of rotation by means of this drive element,
   two unilaterally acting freewheels, each having teeth, wherein the driven element can be driven by the drive element optionally via the first or the second of these two freewheels, and wherein the locked direction of the first of these freewheels corresponds to the free running direction of the second of these freewheels, and wherein the free running direction of the first of these freewheels corresponds to the locked direction of the second of these freewheels,
   an unlocking device for optionally bringing in each case one of the freewheels out of engagement,
   wherein a neutral position is assigned to the drive element, and wherein this neutral position is a predefined rotation position of the drive element in which both the first and the second freewheel is in an engaged position and contact an inner toothing of the driven element with their teeth, characterised in that a restoring device is provided for the drive element and acts in the direction of the neutral position when the drive element is deflected, and in that a first stop is provided for limiting the pivotability of the drive element in its first direction of rotation and a second stop is provided for limiting the pivotability of the drive element in its second direction of rotation, which is opposite to the first and an arresting device is provided for acting on an outer toothing of the driven element.

2. Device according to claim 1, characterised in that the pivotability of the drive element is limited by means of the first and the second stop in such a way that the pivot angle which is travelled through by the driven element driven by the drive element as the drive element pivots from its stop position defined by the first stop to its stop position defined by the second stop, or vice versa, is smaller than the maximum pivot angle of the driven element which can be travelled through by the driven element due to a driving load of the drive element.

3. Device according to claim 1, characterised in that a housing is provided, with respect to which both the drive element and the driven element can be pivoted, wherein the first stop and the second stop are in each case formed on this housing.

4. Device according to claim 1, characterised in that the restoring device has at least a first spring element.

5. Device according to claim 4, characterised in that the restoring device has precisely one spring element designed in particular as a torsion spring, by means of which, when the drive element is deflected out of its neutral position in either of the two directions of rotation of this drive element, a restoring force respectively oriented in the direction of the neutral position of the drive element is generated.

6. Device according to claim 1, characterised in that the first unilaterally acting freewheel has a first spring-loaded pawl, and in that the second unilaterally acting freewheel has a second spring-loaded pawl.

7. Device according to claim 6, characterised in that the first spring-loaded pawl cooperates with the inner toothing of the driven element to form the first unilaterally acting freewheel and the second spring-loaded pawl cooperates with this inner toothing to form the second unilaterally acting freewheel.

8. Device according to claim 1, characterised in that the unlocking device cooperates with the drive element in such a way that a pivoting of the drive element out of its neutral position automatically brings one of the two freewheels out of engagement, depending on the direction of pivoting of this drive element, and in that this respective freewheel is automatically brought back into engagement by pivoting the drive element back into its neutral position.

9. Device according to claim 8, characterised in that the distance of the first stop from the neutral position of the drive element and the distance of the second stop from the neutral position of the drive element is in each case dimensioned such that the or each tooth of the pawl of the other freewheel which is in an engaged position during this pivoting of the drive element moves over a number of teeth of the inner toothing in its free running direction which is less than four when the drive element during this pivoting has been pivoted as far as a stop position against one of these stops.

10. Device according to claim 1, characterised in that said arresting device is spring loaded and is in an arrested position in defined positions of the driven element.

11. Vehicle seat with a seat height adjustment mechanism for seat height adjustment of this vehicle seat, characterised in that this seat height adjustment mechanism comprises a device according to one of the preceding claims.

* * * * *